(12) United States Patent
Yoder et al.

(10) Patent No.: US 11,644,242 B2
(45) Date of Patent: May 9, 2023

(54) REMOTE INSPECTION, REMOVAL, AND INSTALLATION OF REFRACTORY

(71) Applicant: ExxonMobil Technology and Engineering Company, Annandale, NJ (US)

(72) Inventors: Patrick L. Yoder, Montgomery, TX (US); Christopher J. Fowler, Houston, TX (US); Aaron M. Schlett, Conroe, TX (US); Laura E. Johnsen, Spring, TX (US)

(73) Assignee: ExxonMobil Technology and Engineering Company, Annandale, NJ (US)

( * ) Notice: Subject to any disclaimer, the term of this patent is extended or adjusted under 35 U.S.C. 154(b) by 595 days.

(21) Appl. No.: 16/709,983

(22) Filed: Dec. 11, 2019

(65) Prior Publication Data

US 2020/0208916 A1 Jul. 2, 2020

Related U.S. Application Data

(60) Provisional application No. 62/784,894, filed on Dec. 26, 2018.

(51) Int. Cl.
  *F27D 21/00* (2006.01)
  *F27D 1/00* (2006.01)
  (Continued)

(52) U.S. Cl.
  CPC ......... *F27D 21/0021* (2013.01); *F27D 1/004* (2013.01); *F27D 1/0009* (2013.01);
  (Continued)

(58) Field of Classification Search
  CPC ......... F27D 1/0009; F27D 1/004; F27D 1/16; F27D 1/1621; F27D 2001/005; F27D 2021/026; F27D 21/0021
  (Continued)

(56) References Cited

U.S. PATENT DOCUMENTS 3,827,633 A * 8/1974 Kouno ............... C21B 7/06
                                                 239/132.3
RE28,305 E   1/1975 Williamson et al.
(Continued)

FOREIGN PATENT DOCUMENTS

DE   10013031 A1   9/2001
EP   2255905 A1   12/2010
(Continued)

OTHER PUBLICATIONS

The International Search Report and Written Opinion of PCT/US2019/065579 dated Feb. 13, 2020.

*Primary Examiner* — Jessee R Roe
*Assistant Examiner* — Michael Aboagye
(74) *Attorney, Agent, or Firm* — Vorys, Sater, Seymour and Pease LLP

(57) ABSTRACT

A method of treating refractory-lined equipment includes accessing an interior of the refractory-lined equipment with an equipment repair apparatus, wherein the equipment repair apparatus includes a robotic arm and one or more end effectors coupled to an end of the robotic arm, inspecting refractory material that lines an inner wall of the refractory-lined equipment with a first end effector coupled to the end of the robotic arm, removing damaged refractory material from the inner wall with a second end effector coupled to the end of the robotic arm, removing one or more anchors from the inner wall with a third end effector coupled to the end of the robotic arm, and installing new refractory material on the inner wall with a fourth end effector coupled to the end of the robotic arm.

15 Claims, 7 Drawing Sheets

(51) Int. Cl.
*F27D 1/16* (2006.01)
*F27D 21/02* (2006.01)

(52) U.S. Cl.
CPC .............. *F27D 1/16* (2013.01); *F27D 1/1621* (2013.01); *F27D 2001/005* (2013.01); *F27D 2021/026* (2013.01)

(58) Field of Classification Search
USPC ......... 266/78, 280; 431/2; 373/87, 137, 155, 373/162, 164
See application file for complete search history.

(56) References Cited

U.S. PATENT DOCUMENTS

| | | | |
|---|---|---|---|
| 4,253,646 A | 3/1981 | Goto et al. | |
| 4,465,648 A * | 8/1984 | Kiriyama | F27D 1/16 425/13 |
| 4,786,227 A * | 11/1988 | Kremer | C21C 5/441 266/281 |
| 4,787,796 A * | 11/1988 | Melan | F27D 1/1621 266/281 |
| 4,880,211 A * | 11/1989 | Head | C21B 7/06 266/281 |
| 5,018,923 A * | 5/1991 | Melan | E04G 21/22 414/744.5 |
| 5,127,736 A | 7/1992 | Neiheisel | |
| 6,780,351 B2 | 8/2004 | Wirth | |
| 6,922,252 B2 | 7/2005 | Harvill et al. | |
| 9,964,250 B2 * | 5/2018 | Lewis, Sr. | B08B 9/04 |
| 2002/0158368 A1 | 10/2002 | Wirth | |
| 2013/0300181 A1 | 11/2013 | Bystedt | |

FOREIGN PATENT DOCUMENTS

| | | | | |
|---|---|---|---|---|
| JP | S6050105 | * | 3/1985 | ........... F27D 1/0046 |
| JP | H0599640 | * | 4/1993 | ......... F27D 21/0021 |
| KR | 20130066013 A | | 6/2013 | |

* cited by examiner

REMOTE INSPECTION, REMOVAL, AND INSTALLATION OF REFRACTORY

CROSS REFERENCE TO RELATED APPLICATION

This application relates and claims priority to U.S. Provisional Patent Application No. 62/784,894, filed on Dec. 26, 2018, the disclosure of which is incorporated herein specifically by reference in its entirety.

BACKGROUND

Refractory liners have been used for many years in process vessels, reactors, conduits, furnaces, and the like to provide thermal insulation and in environments such as fluidized catalytic reactors, regenerators, or stacks, to provide resistance to corrosion, abrasion/erosion, which are typically operated at elevated temperatures. Refractory liners are comprised of two essential elements, the anchor, which serves to tie it to the underlying structure requiring protection, and the refractory material that provides said protection. Refractory liners not only serve to thermally insulate equipment, but also prolong the useful life of the equipment by shielding it from corrosion and erosion/abrasion. Over time, normal wear and tear of the refractory material requires periodic inspection to ensure the material has adequate remaining life to insure safe operation of the equipment it is designed to protect. When damage is detected, localized repairs are undertaken to avoid long-term catastrophic failures and unnecessary or premature refurbishment of the entire refractory lining.

Refractory inspection, removal, and repair have historically been a manual task. In large refractory-lined equipment, for example, personnel (e.g., a worker) are required to physically enter the interior of the refractory-lined equipment and visually examine the current state of the refractory. Complex scaffolding, ladders, or other engineering systems must often be erected within the interior of the equipment to support the worker at the proper elevation. If the refractory requires repair, the worker must physically remove the refractory by mechanical means, such as by using a jackhammer or a high-pressure waterjet. If the anchors that secure the refractory to the inner wall of the equipment are damaged, such anchors must also be removed by the worker. The worker then installs new anchors using various welding or attachment techniques, and new refractory can be subsequently installed by the worker to the newly installed anchors.

Physical entry into the refractory-lined equipment can be time consuming and often exposes workers to several safety risks, including confined space entry, falling debris, chemical contaminants, and working at elevated locations. There can also be significant collateral damage associated with removal of refractory and the mechanical work associated with reinstalling anchors and refractory material. For instance, repair work done in the field under less-than-ideal conditions can lead to quality issues, which may require rework or acceptance of lower quality work.

In small refractory-lined equipment, such as transfer lines, conduits, or pipes, workers are unable to physically enter such structures to inspect for damage and make repairs. With such smaller equipment, complete sections of the damaged equipment must be entirely removed and replaced with newly manufactured sections.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DESCRIPTION

The present disclosure is related to refractory-lined equipment and, more particularly, to treating refractory-lined equipment by remote inspection, removal, and installation of refractory material lining the walls of the refractory-lined equipment.

Refractory inspection, removal, and repair in refractory-lined equipment have historically been done by manual labor with personnel physically accessing the refractory-lined equipment. The embodiments described herein discuss systems and methods of undertaking remote inspection, removal, and repair of refractory, which reduces the amount of time required to inspect and repair refractory-lined equipment and also reduce the exposure of personnel to safety risks associated with traditional methods. Embodiments described herein may accelerate the work process by reducing the need to clean and prepare the refractory-lined equipment to a level safe for vessel entry and reduce exposure of personnel to risks inherent to vessel entry.

Embodiments discussed herein include a method of treating refractory-lined equipment that may include accessing an interior of the refractory-lined equipment with an equipment repair apparatus, wherein the equipment repair apparatus includes a robotic arm and one or more end effectors coupled to an end of the robotic arm. The method may further include inspecting refractory material that lines an inner wall of the refractory-lined equipment with a first end effector coupled to the end of the robotic arm, removing damaged refractory material from the inner wall with a second end effector coupled to the end of the robotic arm, and removing one or more anchors from the inner wall with a third end effector coupled to the end of the robotic arm. The method may also include installing new refractory material on the inner wall with a fourth end effector coupled to the end of the robotic arm.

Figure 1:
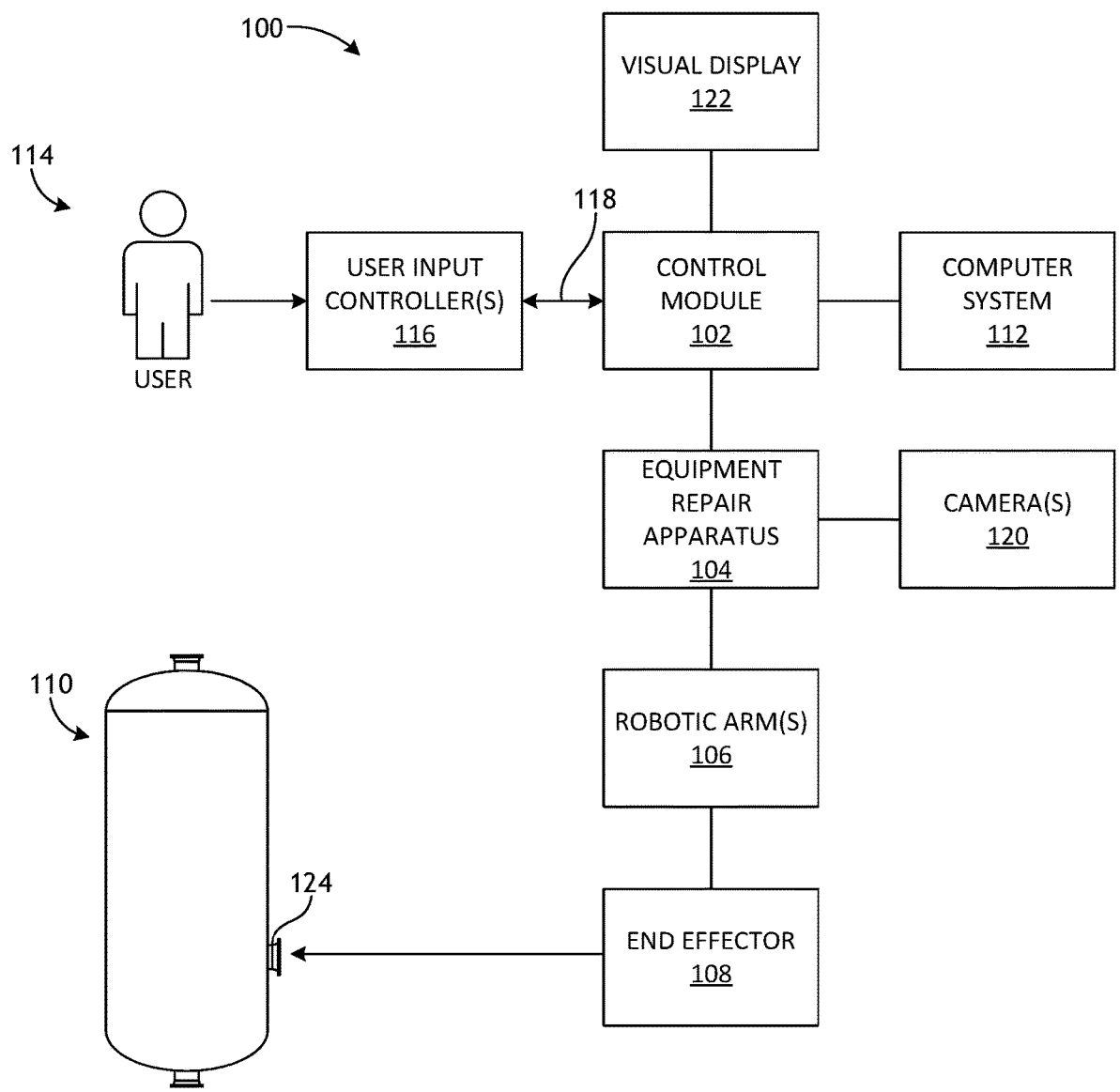
FIG. 1 is a schematic diagram of an example system for remote inspection and repair of refractory-lined equipment, according to one or more embodiments of the present disclosure.

FIG. 1 is a schematic diagram of an example system 100 for remote inspection and repair of refractory-lined equipment, according to one or more embodiments of the present disclosure. As illustrated, the system 100 can include a control module 102 in communication with an equipment repair apparatus 104, alternately referred to as an "equipment repair system." The control module 102 may directly or indirectly communicate with the equipment repair apparatus 104 through any wired or wireless telecommunications medium. The equipment repair apparatus 104 may include or may be operatively coupled to one or more robotic arms 106, and an end effector 108 may be coupled to the end of each robotic arm 106. The end effector 108 may be configured to perform (undertake) one or more tasks on refractory-lined equipment 110. As described herein, the end effector 108 may be removable from the robotic arm 108 and replaceable with other end effectors or devices required to perform (undertake) other tasks on the refractory-lined equipment 110.

As discussed herein, the equipment repair apparatus 104 may be capable of undertaking a variety of operations related to the inspection and repair of the refractory-lined equipment 110. The control module 102 may be configured to control and operate the equipment repair apparatus 104, including articulation and actuation of the robotic arm 106 and the end effector 108. As described below, the robotic arm 106 may be manually operable or otherwise operate autonomously based on programmed instructions. In at least one embodiment, the control module 102 may form an integral part of the equipment repair apparatus 104, but may alternatively be remotely located from the equipment repair apparatus 104. The control module 102 may include a programmable computer system 112, which may include one or more processors operable to control operation of the control module 102 and, thus, control operation of the equipment repair apparatus 104. The computer system 112 may further include one or more memories that provide temporary storage for software code to be executed by the processor(s) or for data acquired from one or more sensors, storage devices, and/or databases.

In some embodiments, the control module 102 may be configured or otherwise programmed to operate autonomously. In such embodiments, the computer system 112 may be programmed with various stances of computer-readable instructions (e.g., software code) that, when executed by the associated processors, cause the control module 102 to operate the equipment repair apparatus 104 in a predetermined manner.

In other embodiments, however, a user 114 may be able to control the equipment repair apparatus 104 in real-time via the control module 102. In such embodiments, the user 114 may communicate with the control module 102 using one or more user input controllers 116. The control module 102 and the user input controllers 116 may be in communication with one another via a communications link 118, which may be any type of wired or wireless telecommunications means configured to carry a variety of communication signals (e.g., electrical, optical, infrared, etc.) according to any communications protocol. The user input controllers 116 may generally include one or more user input devices or physical controllers (e.g., a joystick, exoskeletal gloves, a master manipulator, a keyboard, etc.) that can be grasped by the user 114 and manipulated to operate the equipment repair apparatus 104, including the robotic arms 106 and the end effector 108. More particularly, movement, articulation, and/or actuation of the equipment repair apparatus 104, the robotic arm 106, and the end effector 108 may occur based on user inputs provided by the user 114 via the user input controllers 116. The responsive movement of the robotic arm 106 and the end effector 108 may be precise enough to replicate instinctive hand movements while maintaining natural eye-hand axis.

In some embodiments, the equipment repair apparatus 104 may include one or more image capture devices or cameras 120 capable of providing real-time video or images of the refractory-lined equipment 110 during operation. In such embodiments, the user 114 may be able to view the images captured by the cameras 120 on a visual display 122 forming part of or included on the control module 102. Accordingly, operation of the robotic arms 106 and the associated end effectors 108 may be directed by the user 114 via the user input controllers 116, and the real-time progress of any operation may be viewed by the user 114 on the visual display 122.

The system 100 may provide an automated or remotely operated system for remote inspection, removal, and installation of refractory linings in the refractory-lined equipment 110. The equipment repair apparatus 104 may be able to access the interior of the refractory-lined equipment 110 via an opening 124, such as a manway or the like defined by the refractory-lined equipment 110. In some embodiments, only the robotic arm 106 and attached end effector 108 enter the refractory-lined equipment 110 via the opening 124. In other embodiments, however, the entire equipment repair apparatus 104 may be accommodated within the refractory-lined equipment 110 via the opening 124 and deployed to operate within the interior of the refractory-lined equipment 110.

The embodiments described herein may prove advantageous in eliminating the need for human personnel (e.g., the user 104) to enter the refractory-lined equipment 110 to inspect and repair damaged refractory. This may eliminate the need to expend the time and cost of installing scaffolding to support the personnel and providing proper ventilation and filtration within the refractory-lined equipment 110 for safe personnel entry. Instead, all or a part of the equipment repair apparatus 104 may enter the refractory-lined equipment 110 to facilitate remote inspection, removal, and installation of refractory.

Figure 2:
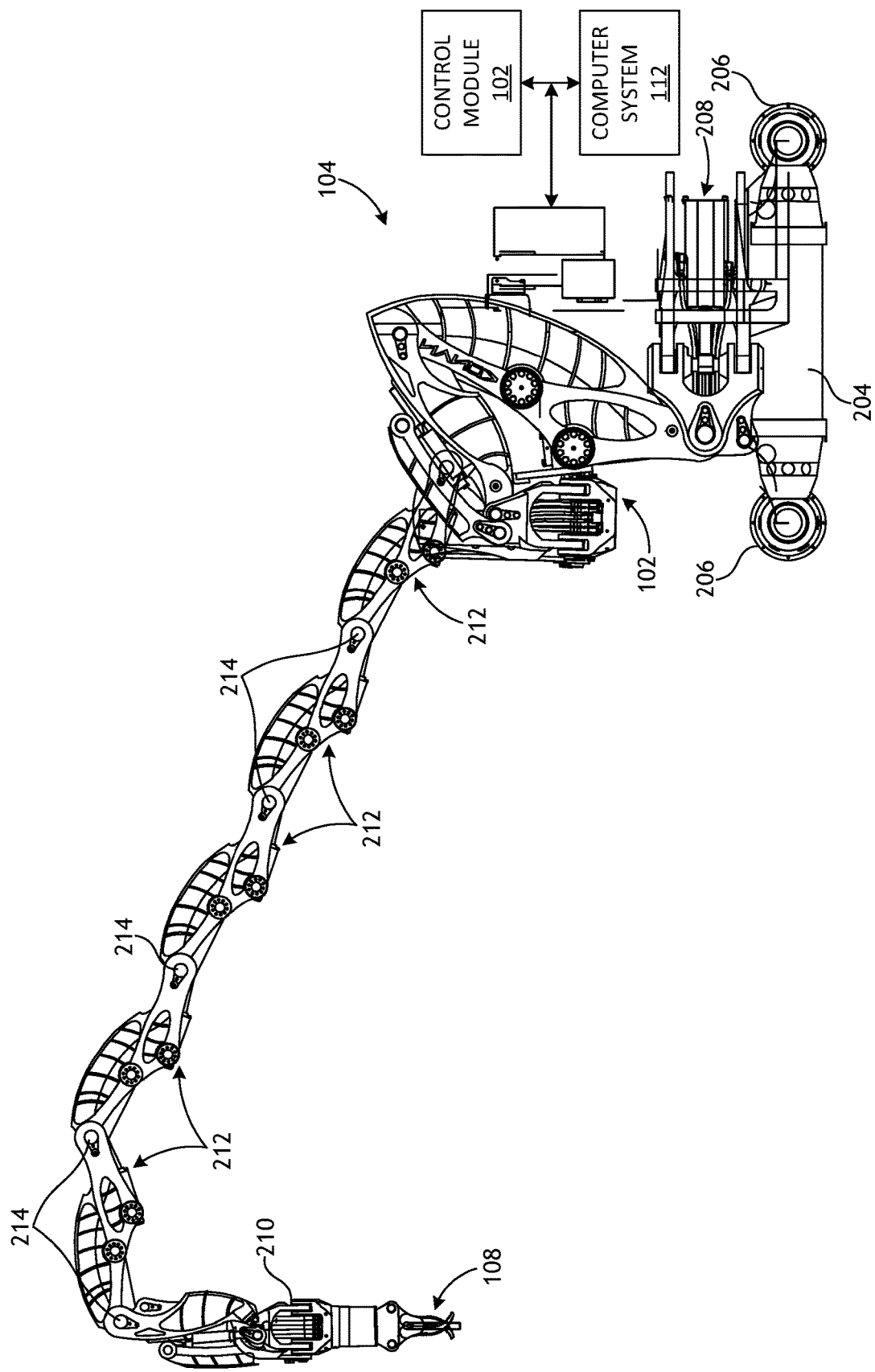
FIG. 2 is a side view of an example equipment repair apparatus that may be used in accordance with the principles of the present disclosure.

FIG. 2 is a side view of an example equipment repair apparatus 104 that may be used in accordance with the principles of the present disclosure. It is noted that the equipment repair apparatus 104 described herein is merely one example of a suitable vehicle, mechanism, or device that may be used in accordance with the principles of the present disclosure. Accordingly, the following description of the equipment repair apparatus 104 should not be considered limiting to the scope of the present disclosure.

As indicated above, the equipment repair apparatus 104 may be in communication (either wired or wireless) with the control module 102 of FIG. 1. In some embodiments, the computer system 112 may form part of the equipment repair apparatus 104, but may otherwise form part of the control module 102, which communicates with the equipment repair apparatus 104.

As illustrated, the equipment repair apparatus 104 may include a main body 202 supported on a chassis 204. In at least one embodiment, the equipment repair apparatus 104 may include one or more wheels 206 rotatably coupled to the chassis 204, thus providing mobility to the equipment repair apparatus 104. In some embodiments, the wheels 206 may be driven by discrete motors or actuation devices arranged at each wheel 206. In other embodiments, however, the wheels 206 may be operatively coupled to a drivetrain powered by a motor. In either scenario, movement of the wheels 206, and thus corresponding translational movement of the equipment repair apparatus 104, may be caused by communication with the computer system 112. The computer system 112 may be programmed to move the equipment repair apparatus 104 either autonomously or based on user input commands given by the user 114 (FIG. 1).

In some embodiments, the equipment repair apparatus 104 may further include a lifting mechanism 208 configured to selectively raise and lower the body 202 relative to the chassis 204. In the illustrated embodiment, the lifting mechanism 208 comprises a scissor lift, but could alternatively be any type of mechanism capable of adjusting the height of the body 202 relative to the chassis 204. A motor may power the lifting mechanism 208 and may be in communication with the computer system 112, which may be programmed to operate the lifting mechanism 208 either autonomously or based on user input commands given by the user 114 (FIG. 1).

The equipment repair apparatus 104 may be powered locally or remotely. In embodiments where the equipment repair apparatus 104 is powered locally, the equipment repair apparatus 104 may include an on-board power source (not shown), such as a series of batteries, one or more fuel cells, an internal combustion engine, or any combination thereof. In embodiments where the equipment repair apparatus 104 is powered remotely, the equipment repair apparatus 104 may be communicably coupled to a remote power source via a communication line, such as an umbilical or other type of wiring.

The robotic arm 106 is operatively coupled to and extends from the main body 202, and the end effector 108 may be operatively coupled to the distal end of the robotic arm 106. More specifically, the end effector 108 may be removably coupled to the robotic arm 106 at a detachable joint 210, which allows the end effector 108 to be removed and replaced with other types of end effectors. While only one robotic arm 106 is depicted in FIG. 2, more than one may be included on the equipment repair apparatus 104. Moreover, while only one end effector 108 is depicted in FIG. 2, more than one may be coupled to the distal end of the robotic arm 106, without departing from the scope of the disclosure.

The robotic arm 106 may include a plurality of articulable joints 212 pivotably and successively coupled to each other at corresponding pivot points 214 located along the length of the robotic arm 106. The pivot points 214 allow the articulable joints 212 to move and pivot in multiple degrees of freedom, thereby allowing the robotic arm 106 to orient the end effector 108 at desired positions.

In some embodiments, an actuator or actuation device (not shown) may be included at one or more of the pivot points 214 and may be individually or simultaneously actuatable to articulate the corresponding articulable joints 212. The actuation devices may comprise, but are not limited to, an electromechanical device (e.g., a servo, a motor, etc.), a hydraulic motor, a pneumatic motor, a geared interface, or any combination thereof. Each actuation device may communicate with the computer system 112, which sends signals to cause selective actuation of the actuation devices and corresponding articulation of the articulable joints 212.

In other embodiments, however, the robotic arm 106 and the end effector 108 may be articulated using a cable driven motion system that includes one or more drive cables (or other elongate members) that extend between the body 202 and the end effector 108 along the length of the robotic arm 106. The drive cables may further extend through alternating pulleys at one or more of the pivot points 214. As the drive cables are selectively actuated (pulled), the articulable joints 212 are caused to pivot about the pivot points 214 and the end effector 108 is articulated to desired angular positions and configurations.

In some embodiments, the detachable joint 210 may also operate as an articulable joint for the end effector 108. In such embodiments, the detachable joint 210 may include one or more actuators or actuation devices in communication with the computer system 112 or may otherwise be operatively coupled to one or more drive cables of the cable driven motion system described above. Actuation of the actuation devices or the drive cables may cause the end effector 108 to articulate similar to the movement of a human wrist. More specifically, the degrees of freedom of the detachable joint 210 may be represented by three translational variables (i.e., surge, heave, and sway), and by three rotational variables (i.e., Euler angles or roll, pitch, and yaw). The translational and rotational variables describe the position and orientation of the end effector 108 with respect to a given reference Cartesian frame. "Surge" refers to forward and backward translational movement, "heave" refers to translational movement up and down, and "sway" refers to translational movement left and right. With regard to the rotational terms, "roll" refers to tilting side to side, "pitch" refers to tilting forward and backward, and "yaw" refers to turning left and right.

In embodiments where the user 114 (FIG. 1) is able to control operation of the equipment repair apparatus 104 via the user input controllers 116 (FIG. 1), the user 114 may be able to view the real-time position and environment of the end effector 108 via the visual display 122 (FIG. 1). While viewing the end effector 108, the user 114 may remotely position and operate the end effector 108 in real-time by grasping and manipulating the position of the user input controllers 116. The user inputs are processed by the computer system 112, and the control module 102 responds by actuating the actuation devices or the drive cables included in the robotic arm 106 and thereby selectively moving and articulating the end effector 108 to desired angular positions and configurations.

In embodiments where the equipment repair apparatus 104 is programmed to operate autonomously, the computer system 112 may be programmed to control operation of the equipment repair apparatus 104 based on a pre-programmed set of steps, processes, or actions. During operation, the computer system 112 may be programmed to calculate and keep track of the real-time position of the end effector 108 based on the mathematical process of inverse kinematics, which takes into account the known geometry of the robotic arm 106 and the end effector 108 relative to the known position of the refractory-lined equipment 110 (FIG. 1).

In the illustrated embodiment, the end effector 108 comprises a high-pressure water nozzle that may be used to clean and/or remove refractory lining the inner wall of the refractory-lined equipment 110 (FIG. 1). The end effector 108, however, may include or otherwise be replaced with a plurality of other types of end effectors designed to undertake a corresponding plurality of operations within the refractory-lined equipment 110. Example end effectors that can be attached to the robotic arm 106 include, but are not limited to, a rotating head/brush, a jackhammer, a saw (or other cutting device), a chemical cleaning apparatus, a vacuum, an image capture device (e.g., a camera), an inspection laser (i.e., two-dimensional, three-dimensional), a sonar instrument, an optical profilometer, an acoustic inspection device, an ultrasonic inspection device, a hammer (or another blunt object), a snipping tool, a grinder, an air carbon arc cutter, a welder, a torque device, a nozzle assembly (i.e., for gunning or shotcreting refractory material), a high pressure water jet, a grit blaster, injection nozzle, or any combination thereof.

Figure 3B:
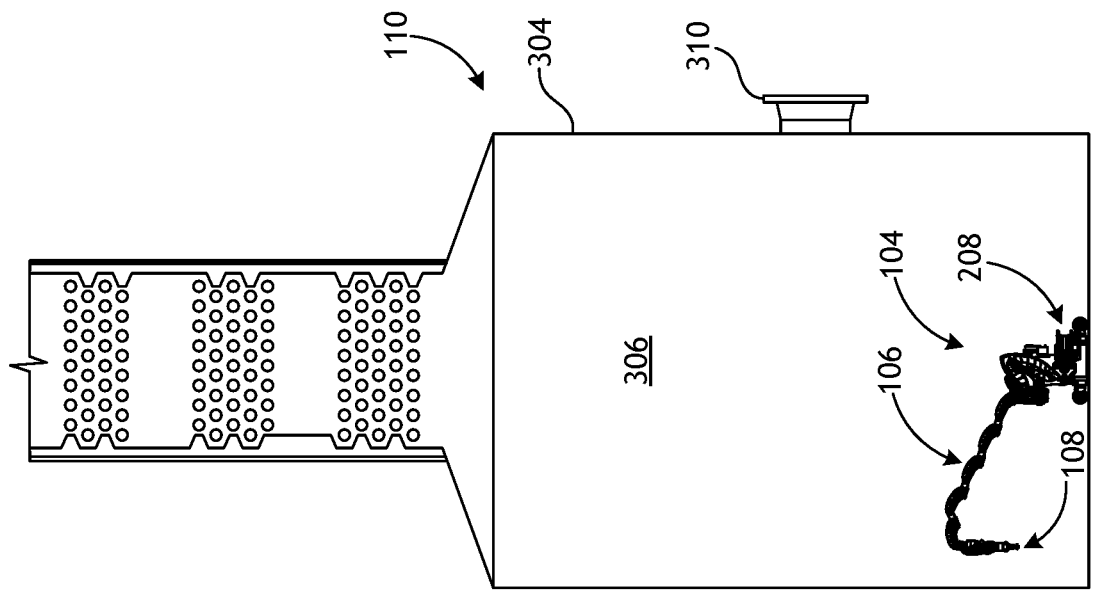
FIGS. 3A and 3B are schematic side views of the equipment repair apparatus of FIG. 2 undertaking an operation within example refractory-lined equipment, according to one or more embodiments.
Figure 3A:
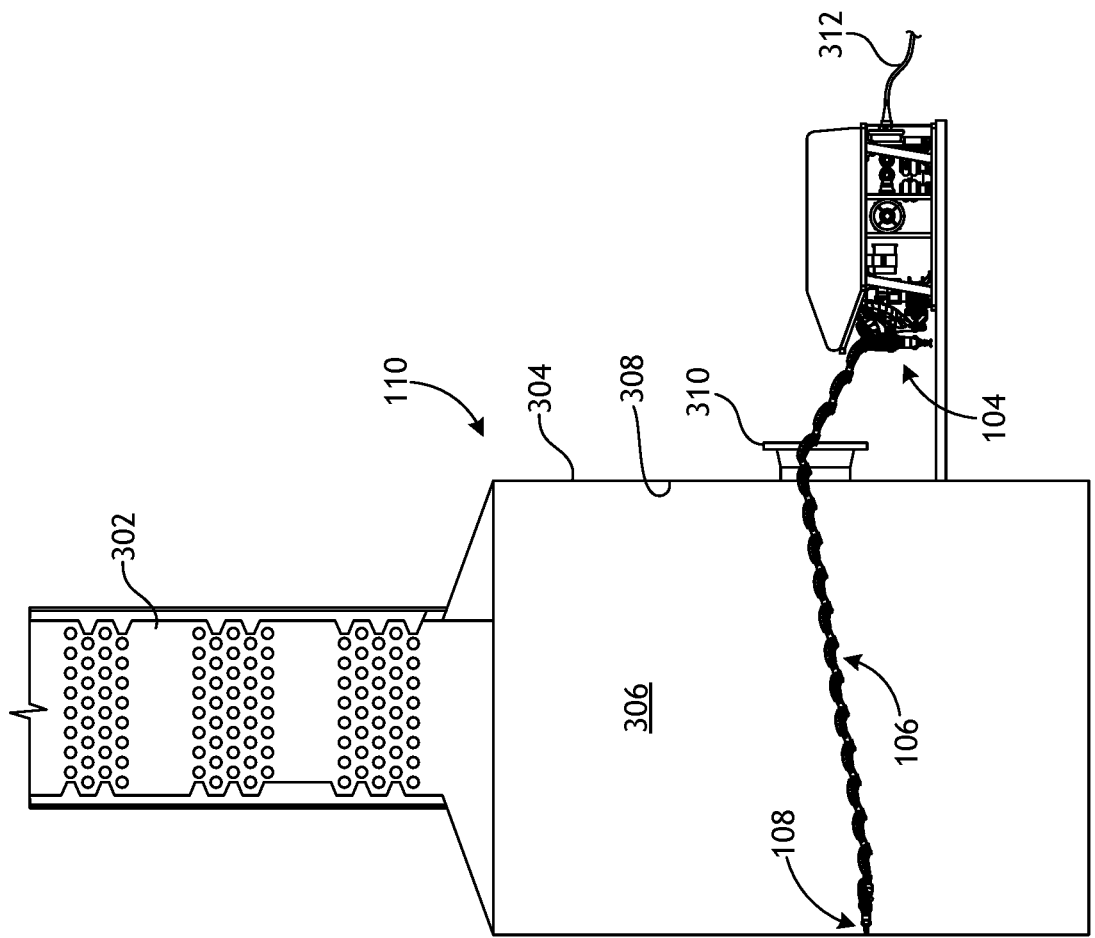

FIG. 3A is a schematic side view of the equipment repair apparatus 104 undertaking an operation within the refractory-lined equipment 110, according to one or more embodiments. In the illustrated embodiment, the refractory-lined equipment 110 comprises a fired heater having an upper convection section 302. The methods described herein, however, may alternatively carried out with other types of equipment commonly lined with refractory including, but not limited to, a processing unit (e.g., fluid catalytic cracking unit or "FCCU"), a reactor vessel, a regenerator, a stack, a process vessel, a pressure vessel, a furnace, a conduit or line (e.g., catalyst transfer line or pipe), an incinerator, a boiler, fired heater, tank, drum, or any combination thereof.

As illustrated, the refractory-lined equipment 110 may include a vessel wall 304, which defines an interior 306 and all or a portion of the inner wall of the interior 306 may be lined or otherwise covered with a refractory material 308. The refractory material 308 may serve to thermally insulate the vessel wall 304, and may also shield it from erosion and abrasion, thus prolonging the useful life of the vessel wall 304. Suitable materials for the refractory material 108 include, but are not limited to, silicon carbide, silicon nitride, magnesia, magnesium oxide, alumina, alumina graphite, magnesia graphite, high temperature porcelain, zirconia, zirconia ceramic, silica, alumino silicates, silicon nitride, ceramic fiber, carbon/graphite, spinel, or any combination thereof. The refractory material 308 may be anchored or otherwise secured to the inner wall via any known anchoring or attachment method.

As illustrated, the interior 306 of the vessel wall 304 may be accessible by the equipment repair apparatus 104 via an opening 310 provided or otherwise defined on the vessel wall 304. In the illustrated embodiment, the opening 310 comprises a manway or the like, but could alternatively comprise any other aperture or void through which the equipment repair apparatus 104 may be able to access the interior 306.

In the illustrated embodiment, only the robotic arm 106 and the attached end effector 108 have penetrated the interior 306 via the opening 310, while the remaining portions of the equipment repair apparatus 104 remain external to the vessel wall 304. In some embodiments, the equipment repair apparatus 104 may be powered by a remote power source (not shown) communicably coupled to the equipment repair apparatus 104 via a communication line 312. In at least one embodiment, the equipment repair apparatus 104 may communicate with the control module 102 (FIGS. 1 and 2) via the communication line 312 also, but may alternatively communicate wirelessly. In other embodiments, however, and as mentioned above, the equipment repair apparatus 104 may be powered locally.

As discussed above, operation of the equipment repair apparatus 104 may be automated or may otherwise be manually operated by a user (e.g., the user 114 of FIG. 1) to undertake a variety of operations. Such operations include, but are not limited to, cleaning the inner walls of the vessel wall 304, inspecting the refractory material 308, repairing the refractory material 308, removing the refractory material 308, removing anchors that support the refractory material 308, installing new anchors to support new refractory material 308, inspecting and testing the new anchors, installing new refractory material 308, and inspecting newly installed refractory material 308. The robotic arm 106 and the end effector 108 may be articulated and actuated as generally described above to carry out such operations. The robotic arm 106 may be able to rotate and articulate as needed to allow the end effector 108 to reach the specific areas requiring refractory repair. Moreover, the end effector 108 may comprise or may be capable of holding multiple attachments capable of cleaning, inspecting refractory, cutting refractory and metal, welding refractory anchors, and installing refractory.

In FIG. 3B, the equipment repair apparatus 104 is wholly located within the interior 306 of the vessel wall 304. In such embodiments, the equipment repair apparatus 104 may be small enough to fit through the opening 310 or, alternatively, the opening 310 may be large enough to accommodate the equipment repair apparatus 104. While inside the vessel wall 304, the robotic arm 106 and the end effector 108 may be articulated and rotated to reach all parts of the interior 306. As needed, the equipment repair apparatus 104 may move or actuate to access all portions of the interior 306. For example, the lifting mechanism 208 may be triggered to raise the robotic arm 106 and the end effector 108 to access the upper levels of the vessel wall 304 as needed.

Figure 4B:
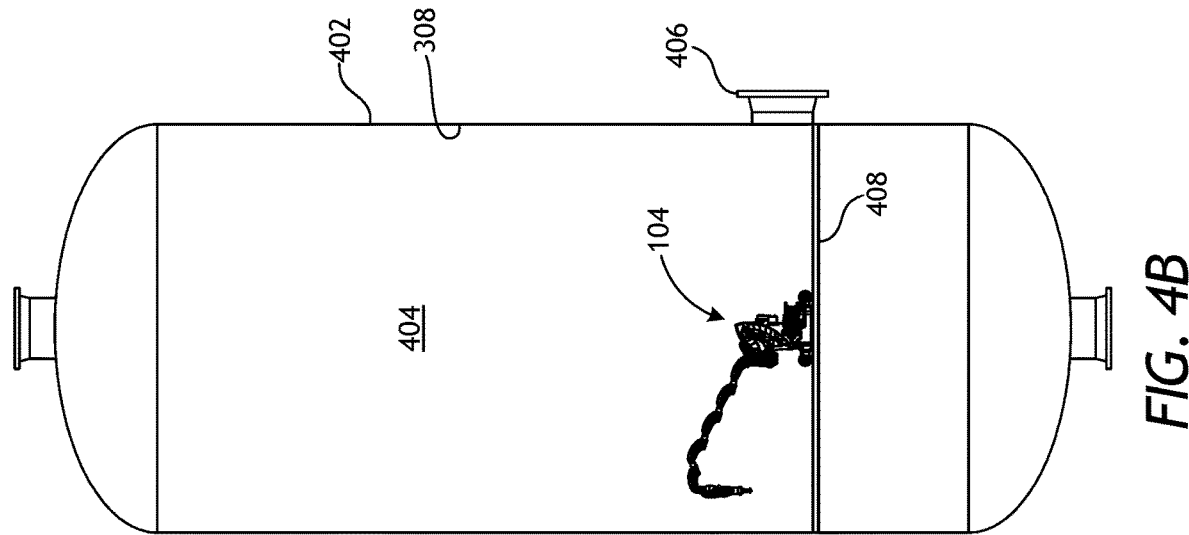
FIGS. 4A and 4B are schematic side views of the equipment repair apparatus of FIG. 2 undertaking an operation within another example refractory-lined equipment, according to one or more embodiments.
Figure 4A:
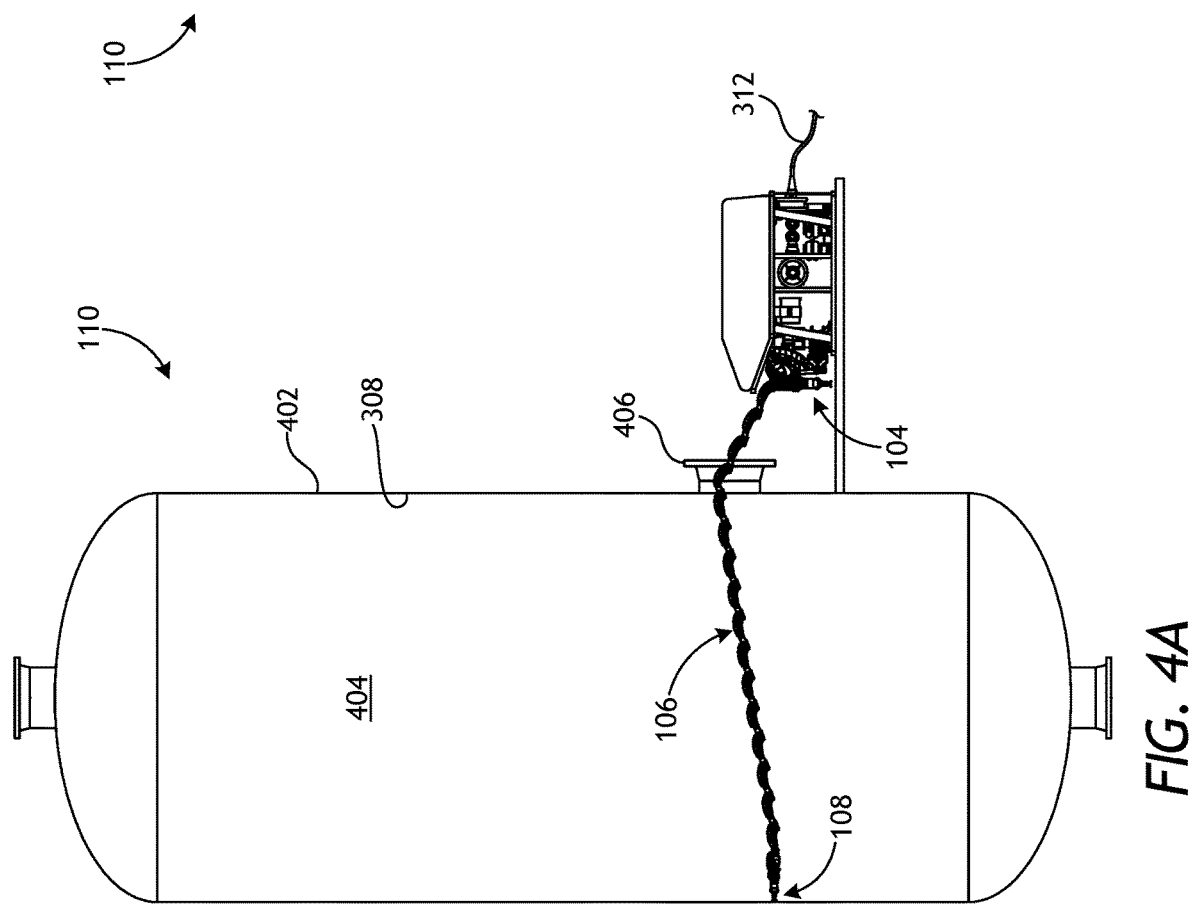

FIGS. 4A and 4B are schematic side views of the equipment repair apparatus 104 undertaking an operation within another example refractory-lined equipment 110, according to one or more embodiments. In the illustrated embodiment, the refractory-lined equipment 110 comprises a pressure vessel having a vessel wall 402, which defines an interior 404 and all or a portion of the inner wall of the interior 404 may be lined or otherwise covered with the refractory material 308. The interior 404 may be accessible by the equipment repair apparatus 104 via an opening 406 provided or otherwise defined on the vessel wall 402, such as a manway or any other aperture or void through which the equipment repair apparatus 104 may be able to access the interior 404.

In FIG. 4A, only the robotic arm 106 and the attached end effector 108 have penetrated the interior 404 via the opening 406, while the remaining portions of the equipment repair apparatus 104 remain external to the vessel wall 402. As with the embodiment of FIG. 3A, the equipment repair apparatus 104 may be powered by a remote power source (not shown) communicably coupled to the equipment repair apparatus 104 via the communication line 312, but could alternatively be powered locally.

In FIG. 4B, the equipment repair apparatus 104 is wholly located within the interior 404 of the vessel wall 402. In at least one embodiment, the equipment repair apparatus 104 may be supported on a support frame 408 positioned within the interior 404 and the equipment repair apparatus 104 may be able to translate back and forth on the support frame 408, as needed.

Operation of the equipment repair apparatus 104 may be automated or may otherwise be manually operated by a user (e.g., the user 114 of FIG. 1) to undertake any of the operations mentioned herein. The robotic arm 106 and the end effector 108 may be articulated and actuated as generally described above to carry out such operations. The robotic arm 106 may be able to rotate and articulate as needed to allow the end effector 108 to reach the specific areas requiring inspection and/or refractory repair.

Figure 5B:
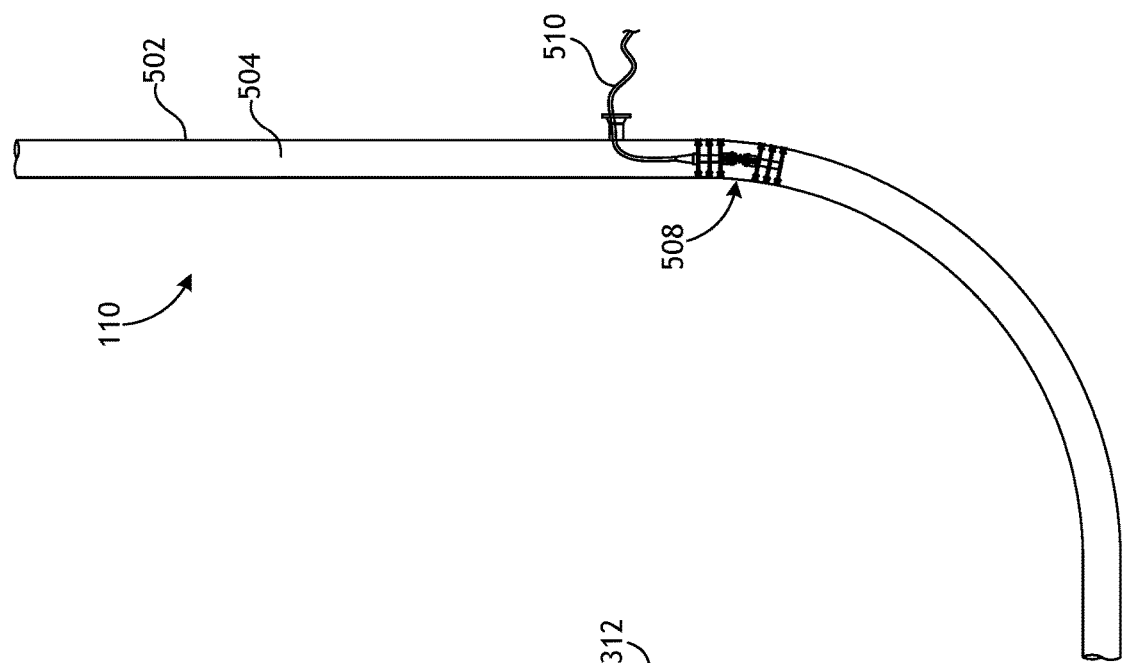
FIG. 5B depicts the tool of FIG. 5A introduced into the refractory-lined equipment of FIG. 5A.
Figure 5A:
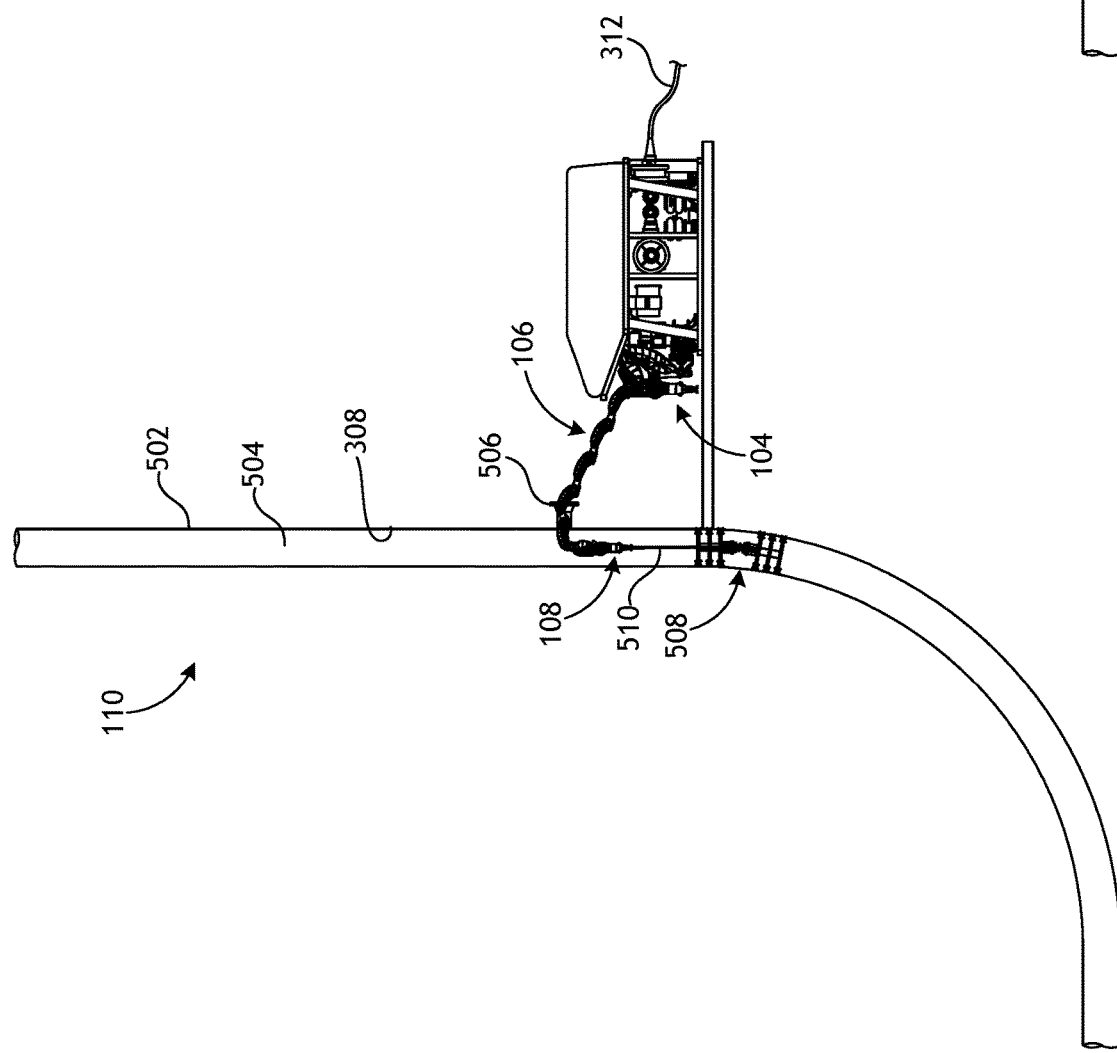
FIG. 5A is a schematic side view of the equipment repair apparatus undertaking an operation within another example refractory-lined equipment, according to one or more embodiments.

FIG. 5A is a schematic side view of the equipment repair apparatus 104 undertaking an operation within another example refractory-lined equipment 110, according to one or more embodiments. In the illustrated embodiment, the refractory-lined equipment 110 comprises a conduit or pipe, such as a catalyst transfer line, that provides a vessel wall 502. The vessel wall 502 defines an interior 504 and all or a portion of the inner wall of the interior 504 may be lined or otherwise covered with the refractory material 308. The interior 504 may be accessible by the equipment repair apparatus 104 via an opening 506 provided or otherwise defined on the vessel wall 502, such as a manway or any other aperture or void through which the equipment repair apparatus 104 may be able to access the interior 504.

In FIG. 5A, only the robotic arm 106 and the attached end effector 108 have penetrated the interior 504 via the opening 506, while the remaining portions of the equipment repair apparatus 104 remain external to the vessel wall 502. As with the embodiment of FIG. 3A, the equipment repair apparatus 104 may be powered by a remote power source (not shown) communicably coupled to the equipment repair apparatus 104 via the communication line 312, but could alternatively be powered locally. In the illustrated embodiment, the end effector 108 includes or is otherwise coupled to a tool 508 used to undertake one or more operations within the interior 504 of the refractory-lined equipment 110. In at least one embodiment, the tool 508 may be tethered to the end effector 108 on a conveyance 510 that allows the tool 508 to traverse the interior 504 of the vessel wall 502.

Operation of the equipment repair apparatus 104 and the tool 508 may be automated or may otherwise be manually operated by a user (e.g., the user 114 of FIG. 1) to undertake any of the operations mentioned herein. The robotic arm 106 and the end effector 108 may be articulated and actuated as generally described above to carry out such operations. Moreover, the tool 508 may be capable of advancing or retracting along the length of the interior 504 to reach the specific areas requiring inspection and/or refractory repair.

FIG. 5B depicts the tool 508 of FIG. 5A introduced into the refractory-lined equipment 110 of FIG. 5A. The tool 508 may access the interior 504 of the vessel wall 502 via the opening 506, and the conveyance 510 may tether the tool 508 to the equipment repair apparatus 104 (not shown), which may be located external to the vessel wall 502.

Figure 6:
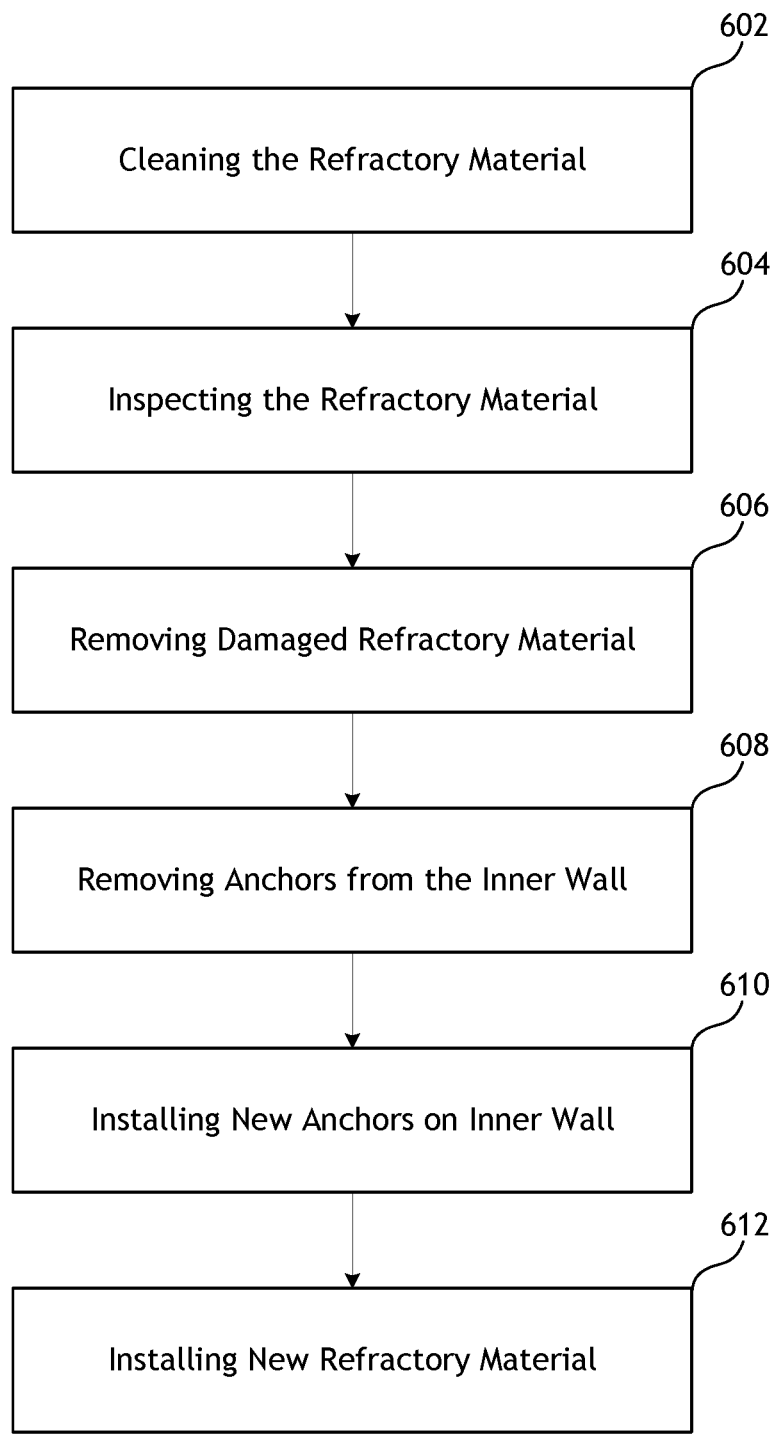
FIG. 6 is a schematic flowchart of an example method of treating refractory-lined equipment, according to one or more embodiments.

FIG. 6 is a schematic flowchart of an example method 600 of treating refractory-lined equipment, according to one or more embodiments. The method 600 may be implemented using any embodiments of the presently described equipment repair apparatus 104 and in conjunction with any examples of the refractory-lined equipment 110 mentioned herein, without departing from the scope of the disclosure. Moreover, any suitable end effector 108 may be used to accomplish the following tasks.

In some embodiments, the method 600 may start with cleaning refractory material that lines the inner wall of the refractory-lined equipment, as at 602. To clean the refractory material, in some embodiments, the end effector 108 may include a water jet that uses high-pressure fluid (e.g., water, gas, etc.) to remove debris or buildup, such as coke buildup, slag, or the like. In other embodiments, the end effector 108 may include a rotating head or brush that may be actuated to agitate the inner wall of the refractory-lined equipment to remove debris or buildup. In yet other embodiments, the end effector 108 may include a jackhammer that may be operated to help remove buildup and/or slag. In even further embodiments, the end effector 108 may include a chemical cleaning apparatus configured to apply a solvent or other chemical formulation capable of removing or degrading buildup on the inner wall of the refractory-lined equipment. In at least one embodiment, the end effector 108 may include a vacuum capable of removing (extracting) debris from the interior of the refractory-lined equipment during (or after) the cleaning process.

Once cleaning is complete, the method 600 may include inspecting refractory material that lines the inner wall of the refractory-lined equipment, as at 604. In some embodiments, this may require the end effector 108 to be swapped out for an inspection tool capable of refractory inspection. Example inspection tools that may be used to inspect the refractory material include, but are not limited to, an image capture device (e.g., the camera 120 of FIG. 1), a laser, a profilometer, an acoustic inspection device, an ultrasonic inspection device, a mechanical testing device, or any combination thereof.

In embodiments where the end effector 108 comprises or includes a camera, images captured by the camera may be viewable by the user on the visual display 122 of FIG. 1 and the user may thereby visually determine the condition of the refractory. In embodiments where the end effector 108 comprises a laser, the laser may be capable of delivering two-dimensional and/or three-dimensional results viewable by a user on the visual display 122. In at least one embodiment, the laser may comprise a laser profiling head configured inspect the refractory material by measuring the refractory lining thickness. In embodiments where the end effector 108 comprises a profilometer, the profilometer may measure the surface of the refractory and provide data to the user for consideration. In embodiments where the end effector 108 comprises a mechanical testing device, the end effector 108 may comprise a hammer or another blunt object, and the refractory material may be struck with the mechanical testing device in various locations. If the sound emanating from the refractory material 308 upon being struck sounds hollow, a void may be present behind the refractory material, which may be an indication that the lining requires repair.

The method 600 may further include removing damaged refractory material from the inner wall, as at 606. In some embodiments, this may require the end effector 108 to be swapped out for a removal tool capable of extracting the refractory material. Example removal tools that may be used to remove the refractory material include, but are not limited to, a jackhammer, a high-pressure water jet, a cutting device, a jet blaster, a grit blaster, a sponge blaster, or any combination thereof. The cutting device may comprise, for example, a rotating tool, such as a saw, a grinder, or the like.

Following refractory removal, the method 600 may include removing one or more anchors from the inner wall, as at 608. For example, anchors that are damaged may require replacement before installing new refectory. In some embodiments, this may require the end effector 108 to be swapped out for a tool capable of removing the anchors. Example tools that may be used to remove the damaged anchors include, but are not limited to, a snipping tool, a grinder, an air carbon arc cutter, or any combination thereof.

In some embodiments, the method 600 may include installing one or more new anchors on the inner wall, as at 610. In at least one embodiment, this step may be preceded by preparing the surface of the inner wall such that it will readily accept the new anchors. Preparing the surface may include removing remnant refractory and debris from the inner wall to expose the underlying metal surface of the inner wall. This may be accomplished with the end effector 108 including or comprising a grinder or a grit blaster (e.g., sand blaster). The surface preparation may be deep enough into the inner metal wall of the vessel wall to facilitate suitable metal weld preparation but not cause structural damage to the vessel wall.

Once the surface has been properly prepared, the end effector 108 may then be caused to attach the anchors to the prepared surface using remote welding technology. In some embodiments, the end effector 108 may comprise a welding system capable of welding the anchors as needed. In at least one embodiment, the end effector 108 may be capable stud welding the new anchors in place. The welding system may facilitate wire feed welding or stick welding, without departing from the scope of the disclosure.

After the anchors have been installed, the equipment repair apparatus 104 may be directed to inspect or otherwise test the anchor installation. In some embodiments, this may require the end effector 108 to be swapped out for an anchor inspection tool such as, but not limited to, a camera, a hammer, a torqometer, an ultrasound tool, a hardness tester, or any combination thereof. In embodiments where the end effector 108 comprises or includes a camera, the camera may comprise a high-definition camera capable of providing high-definition images of the installed anchors to the visual display 122 of FIG. 1 for consideration by the user. In embodiments where the end effector 108 comprises or includes a hammer, the hammer may be used to strike the newly installed anchors. If the anchors are installed improperly, the blows to the anchors will dislodge them from the inner wall. In embodiments where the end effector 108 comprises or includes a torqometer, the torqometer may apply torque to the installed anchors to a predetermined torque setting. Anchors that are improperly attached will fail upon assuming the predetermined amount of torque.

The method 600 may further include installing new refractory material on the inner wall, as at 612. The new refractory material may be installed on the newly installed anchors, but may alternatively be installed on anchors previously installed on the inner wall. In some embodiments, this may require the end effector 108 to be swapped out for a nozzle assembly that may allow the new refractory material to be applied via pneumatic gunning, wet gunning (e.g., shotcreting), pumping into forms (e.g., castables), pumping into a balloon or bladder, or any combination thereof.

In some embodiments, the newly installed refractory material may be finally inspected. In such embodiments, the end effector 108 may comprise or include a camera that allows the user to view and visually inspect the newly installed refractory material via the visual display 122 of FIG. 1. In other embodiments, the end effector 108 may comprise or include a hammer, and the end effector 108 may strike the newly installed refractory material. If installed improperly, the newly installed refractory material may break apart or otherwise crack upon assuming the blows provided by the hammer or another blunt object.

The systems, devices, and methods disclosed herein can be implemented using the computer system 112 of FIG. 1, which may also be referred to herein as a digital data processing system or a programmable system. One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computer system may include clients and servers. A client and server are generally remote from each other and typically interact through a communication network. The relationship of client and server arises by virtue of computer programs running on the respective computers and having a client-server relationship to each other.

The computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and programmable logic devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, e.g., a mouse, a trackball, etc., by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

Figure 7:
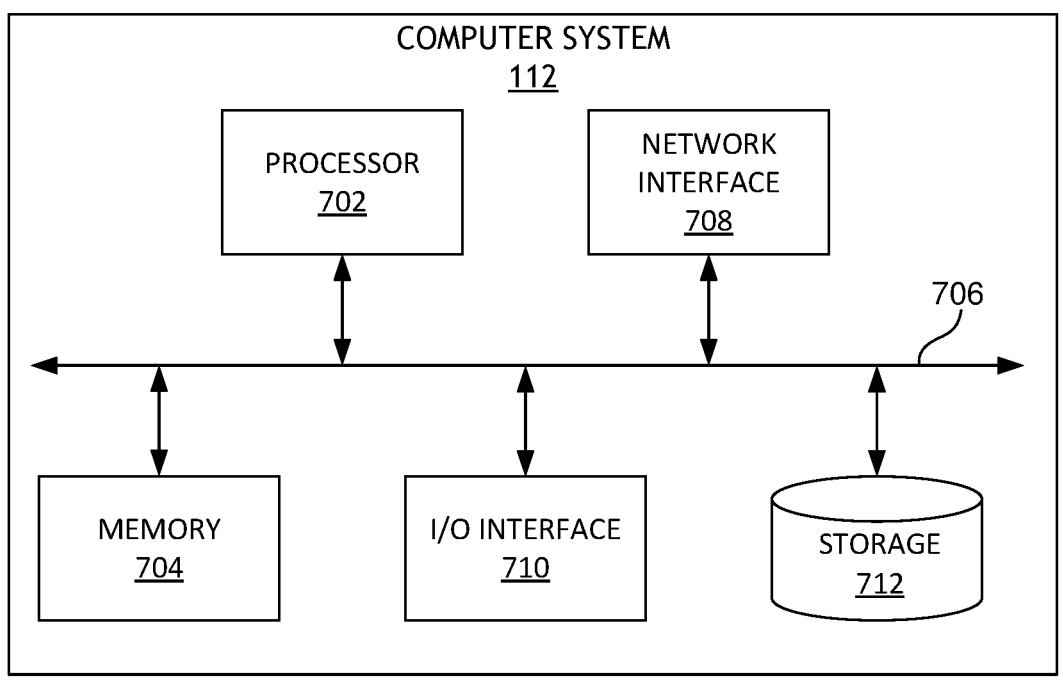
FIG. 7 illustrates an example embodiment of the computer system of FIG. 1.

FIG. 7 illustrates an example embodiment of the computer system 112. As shown, the computer system 112 includes one or more processors 702, which can control the operation of the computer system 112. "Processors" are also referred to herein as "controllers." The processor(s) 702 can include any type of microprocessor or central processing unit (CPU), including programmable general-purpose or special-purpose microprocessors and/or any one of a variety of proprietary or commercially available single or multi-processor systems. The computer system 112 can also include one or more memories 704, which can provide temporary storage for code to be executed by the processor(s) 702 or for data acquired from one or more users, storage devices, and/or databases. The memory 704 can include read-only memory (ROM), flash memory, one or more varieties of random access memory (RAM) (e.g., static RAM (SRAM), dynamic RAM (DRAM), or synchronous DRAM (SDRAM)), and/or a combination of memory technologies.

The various elements of the computer system 112 can be coupled to a bus system 706. The illustrated bus system 706 is an abstraction that represents any one or more separate physical busses, communication lines/interfaces, and/or multi-drop or point-to-point connections, connected by appropriate bridges, adapters, and/or controllers. The computer system 112 can also include one or more network interface(s) 708, one or more input/output (TO) interface(s) 710, and one or more storage device(s) 712.

The network interface(s) 708 can enable the computer system 112 to communicate with remote devices, e.g., other computer systems, over a network, and can be, for non-limiting example, remote desktop connection interfaces, Ethernet adapters, and/or other local area network (LAN) adapters. The IO interface(s) 710 can include one or more interface components to connect the computer system 112 with other electronic equipment. For non-limiting example, the IO interface(s) 710 can include high-speed data ports, such as universal serial bus (USB) ports, 1394 ports, Wi-Fi, Bluetooth, etc. Additionally, the computer system 112 can be accessible to a human user, and thus the IO interface(s) 710 can include displays, speakers, keyboards, pointing devices, and/or various other video, audio, or alphanumeric interfaces.

The storage device(s) 712 can include any conventional medium for storing data in a non-volatile and/or non-transient manner. The storage device(s) 712 can thus hold data and/or instructions in a persistent state, i.e., the value(s) are retained despite interruption of power to the computer system 112. The storage device(s) 712 can include one or more hard disk drives, flash drives, USB drives, optical drives, various media cards, diskettes, compact discs, and/or any combination thereof and can be directly connected to the computer system 112 or remotely connected thereto, such as over a network. In an exemplary embodiment, the storage device(s) 712 can include a tangible or non-transitory computer readable medium configured to store data, e.g., a hard disk drive, a flash drive, a USB drive, an optical drive, a media card, a diskette, a compact disc, etc.

The elements illustrated in FIG. 7 can be some or all of the elements of a single physical machine. In addition, not all of the illustrated elements need to be located on or in the same physical machine. Exemplary computer systems include conventional desktop computers, workstations, minicomputers, laptop computers, tablet computers, personal digital assistants (PDAs), mobile phones, and the like.

The computer system 112 can include a web browser for retrieving web pages or other markup language streams, presenting those pages and/or streams (visually, aurally, or otherwise), executing scripts, controls and other code on those pages/streams, accepting user input with respect to those pages/streams (e.g., for purposes of completing input fields), issuing HyperText Transfer Protocol (HTTP) requests with respect to those pages/streams or otherwise (e.g., for submitting to a server information from the completed input fields), and so forth. The web pages or other markup language can be in HyperText Markup Language (HTML) or other conventional forms, including embedded Extensible Markup Language (XML), scripts, controls, and so forth. The computer system 112 can also include a web server for generating and/or delivering the web pages to client computer systems.

In an exemplary embodiment, the computer system 112 can be provided as a single unit, e.g., as a single server, as a single tower, contained within a single housing, etc. The single unit can be modular such that various aspects thereof can be swapped in and out as needed for, e.g., upgrade, replacement, maintenance, etc., without interrupting functionality of any other aspects of the system. The single unit can thus also be scalable with the ability to be added to as additional modules and/or additional functionality of existing modules are desired and/or improved upon.

The computer system 112 can also include any of a variety of other software and/or hardware components, including by way of non-limiting example, operating systems and database management systems. Although an exemplary computer system is depicted and described herein, it will be appreciated that this is for sake of generality and convenience. In other embodiments, the computer system may differ in architecture and operation from that shown and described here.

Embodiments disclosed herein include:

A. A method of treating refractory-lined equipment includes accessing an interior of the refractory-lined equipment with an equipment repair apparatus, wherein the equipment repair apparatus includes a robotic arm and one or more end effectors coupled to an end of the robotic arm, inspecting refractory material that lines an inner wall of the refractory-lined equipment with a first end effector coupled to the end of the robotic arm, removing damaged refractory material from the inner wall with a second end effector coupled to the end of the robotic arm, removing one or more anchors from the inner wall with a third end effector coupled to the end of the robotic arm, and installing new refractory material on the inner wall with a fourth end effector coupled to the end of the robotic arm.

B. A system that includes an equipment repair apparatus having a robotic arm and a plurality of effectors coupled to an end of the robotic arm, wherein at least the robotic arm and the plurality of end effectors are positionable within an interior of refractory-lined equipment, a control module in communication with the equipment repair apparatus and including a computer system operable to control operation of the equipment repair apparatus, a first end effector of the plurality of end effectors that inspects refractory material lining an inner wall of the refractory-lined equipment, a second end effector of the plurality of end effectors that removes damaged refractory material from the inner wall, a third end effector of the plurality of end effectors that removes one or more anchors from the inner wall, and a fourth end effector of the plurality of end effectors that installs new refractory material on the inner wall.

Each of embodiments A and B may have one or more of the following additional elements in any combination: Element 1: wherein accessing the interior of the refractory-lined equipment with the equipment repair apparatus comprises extending the robotic arm and the one or more end effectors into an interior of the refractory-lined equipment via an opening in a vessel wall of the refractory-lined equipment. Element 2: wherein accessing the interior of the refractory-lined equipment with the equipment repair apparatus comprises positioning the equipment repair apparatus entirely within an interior of the refractory-lined equipment. Element 3: wherein inspecting the refractory material is preceded by cleaning the refractory material that lines the inner wall of the refractory-lined equipment with a fifth end effector coupled to the end of the robotic arm. Element 4: wherein the fifth end effector is selected from the group consisting of a water jet, a rotating head or brush, a jackhammer, a chemical cleaning apparatus, a vacuum, a grit blaster, a jet blaster, and any combination thereof. Element 5: wherein the first end effector is selected from the group consisting of a camera, a laser, a laser profiling head, a sonar inspection device, a profilometer, an acoustic inspection device, an ultrasonic inspection device, a mechanical testing device, a hardness tester, a die penetration tester, and any combination thereof. Element 6: wherein the second end effector is selected from the group consisting of a jackhammer, a water jet, a cutting device, a jet blaster, a grit blaster, and any combination thereof. Element 7: wherein the third end effector is selected from the group consisting of a snipping tool, a grinder, an air carbon arc cutter, and any combination thereof. Element 8: wherein installing the new refractory material is preceded by preparing a surface of the inner wall with a fifth end effector coupled to the end of the robotic arm, installing one or more new anchors on the inner wall with a sixth end effector coupled to the end of the robotic arm, and inspecting the one or more new anchors with a seventh end effector coupled to the end of the robotic arm. Element 9: wherein the fifth end effector comprises a grinder or a grit blaster, and preparing the surface of the inner wall comprises removing refractory and debris from the inner wall to expose an underlying metal surface of the inner wall. Element 10: wherein installing the one or more new anchors comprises welding the one or more new anchors to the inner wall with an eighth end effector coupled to the end of the robotic arm. Element 11: wherein the seventh end effector is selected from the group consisting of a camera, a hammer, a torqometer, a die penetration tester, a hardness tester, and any combination thereof. Element 12: wherein the fourth end effector comprises a nozzle assembly and the new refractory material is installed by one or more of pneumatic gunning, wet gunning, pumping into forms, pumping into a balloon or bladder, and any combination thereof. Element 13: further comprising finally inspecting the new refractory material with a fifth end effector coupled to the end of the robotic arm.

Element 14: wherein the robotic arm comprises a plurality of articulable joints pivotably and successively coupled to each other at corresponding pivot points. Element 15: wherein the control module is programmable to operate the equipment repair apparatus autonomously based on a set of pre-programmed instructions. Element 16: further comprising a visual display in communication with the control module and viewable by a user, an image capture device in communication with the visual display to provide real-time images of the interior of the refractory-lined equipment, and one or more user input controllers in communication with the control module and actuatable by the user to control operation of the robotic arm and the plurality of effectors. Element 17: further comprising a fifth end effector of the plurality of end effectors that cleans the refractory material that lines the inner wall of the refractory-lined equipment. Element 18: further comprising a fifth end effector of the plurality of end effectors that prepares a surface of the inner wall, a sixth end effector of the plurality of end effectors that installs one or more new anchors on the inner wall, and a seventh end effector of the plurality of end effectors that inspects the one or more new anchors.

By way of non-limiting example, exemplary combinations applicable to A and B include: Element 3 with Element 4; Element 8 with Element 9; Element 8 with Element 10; and Element 8 with Element 11.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The use of directional terms such as above, below, upper, lower, upward, downward, left, right, and the like are used in relation to the illustrative embodiments as they are depicted in the figures, the upward direction being toward the top of the corresponding figure and the downward direction being toward the bottom of the corresponding figure.

The invention claimed is:

1. A method of treating refractory-lined equipment, comprising:
   accessing an interior of the refractory-lined equipment with an equipment repair apparatus, wherein the equipment repair apparatus includes a main body supported by a chassis and a lifting mechanism for selectively adjusting a height of the main body relative to the chassis, one or more wheels coupled to the chassis, a robotic arm extending from the main body and an actuation device or drive cables for articulating the robotic arm, and one or more end effectors coupled to an end of the robotic arm;
   inspecting refractory material that lines an inner wall of the refractory-lined equipment with a first end effector coupled to the end of the robotic arm;
   removing damaged refractory material from the inner wall with a second end effector coupled to the end of the robotic arm;

removing one or more anchors from the inner wall with a third end effector coupled to the end of the robotic arm;

installing new refractory material on the inner wall with a fourth end effector coupled to the end of the robotic arm;

adjusting the height of the main body relative to the chassis with the lifting mechanism during one or more of the inspecting refractory material, removing damaged refractory material, removing one or more anchors, and installing new refractory material; and articulating the robotic arm with the actuation device or drive cables during one or more of the inspecting refractory material, removing damaged refractory material, removing one or more anchors, and installing new refractory material.

2. The method of claim 1, wherein accessing the interior of the refractory-lined equipment with the equipment repair apparatus comprises extending the robotic arm and the one or more end effectors into an interior of the refractory-lined equipment via an opening in a vessel wall of the refractory-lined equipment.

3. The method of claim 1, wherein accessing the interior of the refractory-lined equipment with the equipment repair apparatus comprises positioning the equipment repair apparatus entirely within an interior of the refractory-lined equipment.

4. The method of claim 1, wherein inspecting the refractory material is preceded by cleaning the refractory material that lines the inner wall of the refractory-lined equipment with a fifth end effector coupled to the end of the robotic arm.

5. The method of claim 4, wherein the fifth end effector is selected from the group consisting of a water jet, a rotating head or brush, a jackhammer, a chemical cleaning apparatus, a vacuum, a grit blaster, a jet blaster, and any combination thereof.

6. The method of claim 1, wherein the first end effector is selected from the group consisting of a camera, a laser, a laser profiling head, a sonar inspection device, a profilometer, an acoustic inspection device, an ultrasonic inspection device, a mechanical testing device, a hardness tester, a die penetration tester, and any combination thereof.

7. The method of claim 1, wherein the second end effector is selected from the group consisting of a jackhammer, a water jet, a cutting device, a jet blaster, a grit blaster, and any combination thereof.

8. The method of claim 1, wherein the third end effector is selected from the group consisting of a snipping tool, a grinder, an air carbon arc cutter, and any combination thereof.

9. The method of claim 1, wherein installing the new refractory material is preceded by: preparing a surface of the inner wall with a fifth end effector coupled to the end of the robotic arm;

installing one or more new anchors on the inner wall with a sixth end effector coupled to the end of the robotic arm; and inspecting the one or more new anchors with a seventh end effector coupled to the end of the robotic arm.

10. The method of claim 9, wherein the fifth end effector comprises a grinder or a grit blaster, and preparing the surface of the inner wall comprises removing refractory and debris from the inner wall to expose an underlying metal surface of the inner wall.

11. The method of claim 9, wherein installing the one or more new anchors comprises welding the one or more new anchors to the inner wall with an eighth end effector coupled to the end of the robotic arm.

12. The method of claim 9, wherein the seventh end effector is selected from the group consisting of a camera, a hammer, a torqometer, a die penetration tester, a hardness tester, and any combination thereof.

13. The method of claim 1, wherein the fourth end effector comprises a nozzle assembly and the new refractory material is installed by one or more of pneumatic gunning, wet gunning, pumping into forms, pumping into a balloon or bladder, and any combination thereof.

14. The method of claim 1, further comprising finally inspecting the new refractory material with a fifth end effector coupled to the end of the robotic arm.

15. A system for treating refractory-lined equipment, comprising: an equipment repair apparatus having a main body supported by a chassis and a lifting mechanism to selectively adjust a height of the main body relative to the chassis, one or more wheels coupled to the chassis, a robotic arm extending from the main body and an actuation device or drive cables to articulate the robotic arm, and a plurality of effectors coupled to an end of the robotic arm, wherein at least the robotic arm and the plurality of end effectors are positionable within an interior of refractory-lined equipment; a control module in communication with the equipment repair apparatus and including a computer system operable to control operation of the equipment repair apparatus; a first end effector of the plurality of end effectors that inspects refractory material lining an inner wall of the refractory-lined equipment; a second end effector of the plurality of end effectors that removes damaged refractory material from the inner wall; a third end effector of the plurality of end effectors that removes one or more anchors from the inner wall; and a fourth end effector of the plurality of end effectors that installs new refractory material on the inner wall.

* * * * *